United States Patent
Sakata

(10) Patent No.: US 9,745,977 B2
(45) Date of Patent: Aug. 29, 2017

(54) PUMP

(71) Applicant: JTEKT CORPORATION, Osaka-shi (JP)

(72) Inventor: Takatoshi Sakata, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 88 days.

(21) Appl. No.: 14/713,051

(22) Filed: May 15, 2015

(65) Prior Publication Data
US 2015/0337835 A1    Nov. 26, 2015

(30) Foreign Application Priority Data

May 23, 2014    (JP) .................. 2014-106723

(51) Int. Cl.
| F04C 2/10 | (2006.01) |
|---|---|
| F04C 15/00 | (2006.01) |
| B60T 8/40 | (2006.01) |
| B60T 8/48 | (2006.01) |
| F04D 13/06 | (2006.01) |
| F04C 11/00 | (2006.01) |
| F01C 19/00 | (2006.01) |
| F04C 2/08 | (2006.01) |
| F01C 21/10 | (2006.01) |

(52) U.S. Cl.
CPC ............ *F04C 2/084* (2013.01); *B60T 8/4031* (2013.01); *B60T 8/4872* (2013.01); *F01C 19/005* (2013.01); *F01C 21/10* (2013.01); *F04C 2/10* (2013.01); *F04C 2/102* (2013.01); *F04C 11/001* (2013.01); *F04C 15/008* (2013.01); *F04C 15/0023* (2013.01); *F04C 15/0026* (2013.01); *F04C 15/0034* (2013.01); *F04C 15/0038* (2013.01); *F04D 13/0666* (2013.01); *F04C 2/086* (2013.01); *F04C 2240/30* (2013.01)

(58) Field of Classification Search
CPC .. F04C 2/102; F04C 15/0026; F04C 15/0023; F04C 11/001; F04C 2/10; F04C 15/0038; B60T 8/4031; B60T 8/4872; F04D 13/0666; F01C 19/005
See application file for complete search history.

(56) References Cited

U.S. PATENT DOCUMENTS

| 6,113,360 A * | 9/2000 | Yu ........................... F04C 2/102 |
|---|---|---|
| | | 417/310 |
| 6,168,401 B1 * | 1/2001 | Schenck .............. F02M 37/045 |
| | | 418/248 |
| 2011/0229361 A1 | 9/2011 | Kuroda et al. |

FOREIGN PATENT DOCUMENTS

JP    2011-190763    9/2011

* cited by examiner

*Primary Examiner* — Mark Laurenzi
*Assistant Examiner* — Wesley Harris
(74) *Attorney, Agent, or Firm* — Oblon, McClelland, Maier & Neustadt, L.L.P.

(57) ABSTRACT

A pump includes: a housing in which a pump chamber accommodating an inner rotor and an outer rotor is formed in a pump chamber formation surface, and an O-ring groove is formed around the pump chamber; an O-ring that is placed in the O-ring groove; and a plate that is attached to the pump chamber formation surface and closely contacts the O-ring to close the pump chamber. Inter-hole grooves connecting to an outer edge of the pump chamber formation surface are formed around the O-ring groove.

6 Claims, 6 Drawing Sheets

PUMP

INCORPORATION BY REFERENCE

The disclosure of Japanese Patent Application No. 2014-106723 filed on May 23, 2014 including the specification, drawings and abstract, is incorporated herein by reference in its entirety.

BACKGROUND OF THE INVENTION

1. Field of the Invention

The present invention relates to pumps that suck and discharge fluid such as oil.

2. Description of the Related Art

As described in Japanese Patent Application Publication No. 2011-190763 (JP 2011-190763 A), an internal gear pump has an inner rotor having external teeth formed on its outer periphery, an outer rotor having internal teeth formed on its inner periphery, a housing having a pump chamber that accommodates the inner rotor and the outer rotor, and a plate attached to the housing in close contact therewith so as to close the pump chamber.

In the pump having such a structure, salt water such as seawater enters between the housing and the plate from the outside due to capillary action, and salt remains therebetween, which may cause rusting between the housing and the plate. This rust moves the housing and the plate away from each other, slightly separating the housing and the plate from each other. Side clearance between the inner rotor and the housing or plate or between the outer rotor and the housing or plate thus increases, which reduces capacity efficiency as the ratio of an actual discharge rate to a theoretical discharge rate.

SUMMARY OF THE INVENTION

It is one object of the present invention to provide a pump capable of preventing reduction in capacity efficiency.

A pump according to an aspect of the present invention includes: a housing in which a pump chamber accommodating a rotary member is formed in a pump chamber formation surface, and an O-ring groove is formed around the pump chamber in the pump chamber formation surface; an O-ring that is placed in the O-ring groove; and a plate that is attached to the pump chamber formation surface and closely contacts the O-ring to close the pump chamber. A discharge recess connecting to an outer edge of the pump chamber formation surface is formed along an entire circumference of the O-ring groove in the pump chamber formation surface.

In the pump configured as described above, even if salt water enters between the housing and the plate, rainwater enters the discharge recess connecting to the outer edge of the pump chamber formation surface and rinses off the salt present between the housing and the plate when it rains. The salt therefore does not remain between the housing and the plate. This prevents rusting from the salt remaining between the housing and the plate and prevents reduction in capacity efficiency due to an increase in side clearance.

Since the discharge recess is formed in the pump chamber formation surface, the area of a close contact surface between the housing and the plate is small as compared to pumps having no discharge recess formed in the pump chamber formation surface. Accordingly, even if rust forms on the close contact surface between the housing and the plate, a force of the rust that moves the housing and the plate away from each other is small due to the small area of the close contact surface between the housing and the plate, as compared to the pumps having no discharge recess formed in the pump chamber formation surface. The housing and the plate are therefore less likely to be separated from each other, and the side clearance is less likely to be increased. This suppresses reduction in capacity efficiency due to an increase in side clearance.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention will be described below with reference to the accompanying drawings.

Figure 1:
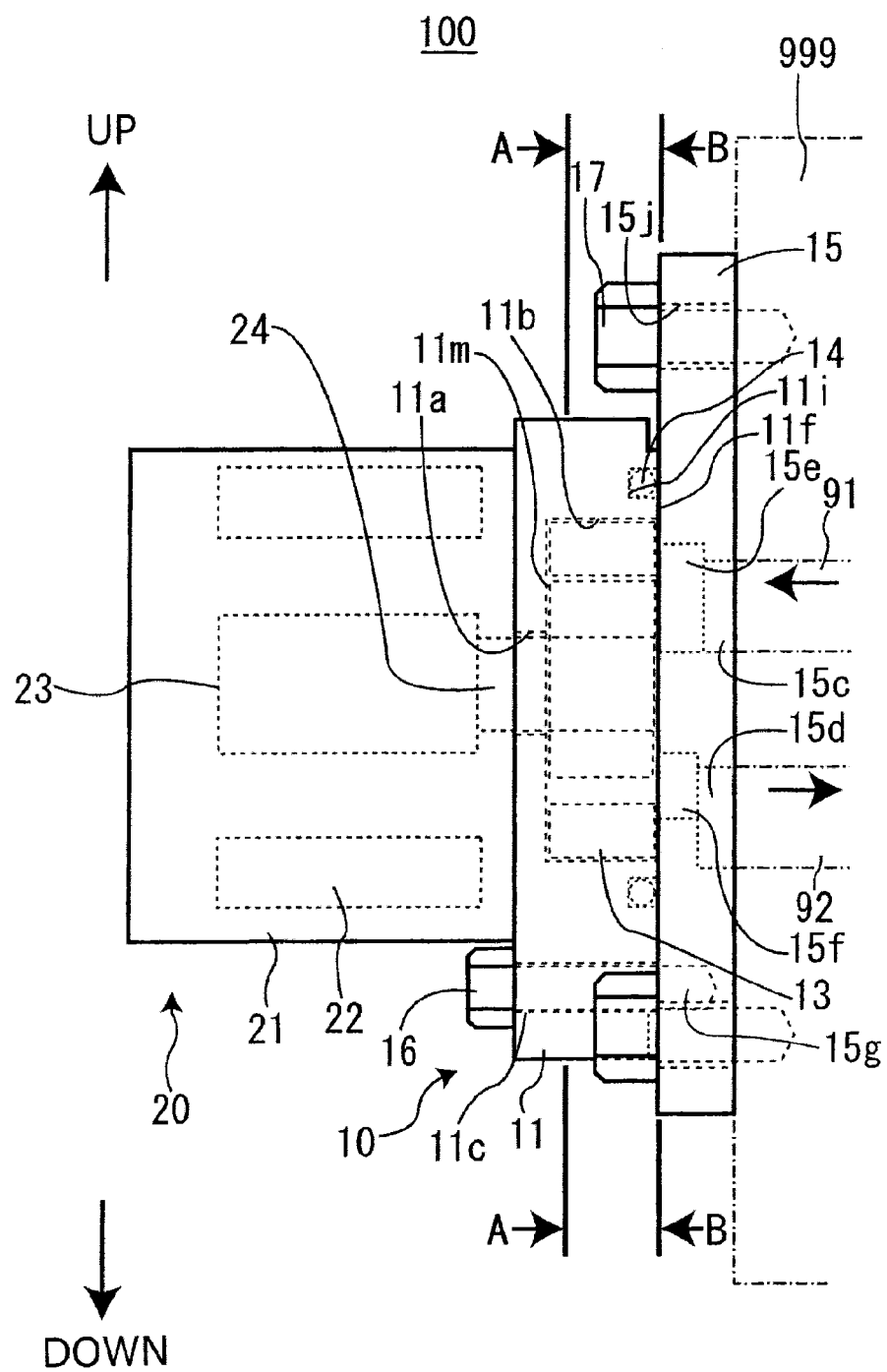
FIG. 1 is a side view of a pump.

Referring to FIG. 1, a pump 100 has a pump body 10 and a motor 20. The pump body 10 is driven by the motor 20 to supply oil having a predetermined oil pressure to an external device 999 such as a transmission. The pump body 10 will be described in detail later.

The motor 20 outputs a rotational driving force to the pump body 10. The motor 20 has a stator 22 fixed to a casing 21 and formed by a coil, a rotor 23 rotatably provided radially inward of the stator 22 and formed by a permanent magnet, and a rotary shaft 24 of the rotor 23.

The structure of the pump body 10 will be described below with reference to FIGS. 1 and 2. The pump body 10 is mainly formed by a housing 11, an inner rotor 12, an outer rotor 13, an O-ring 14, and a plate 15.

Figure 3:
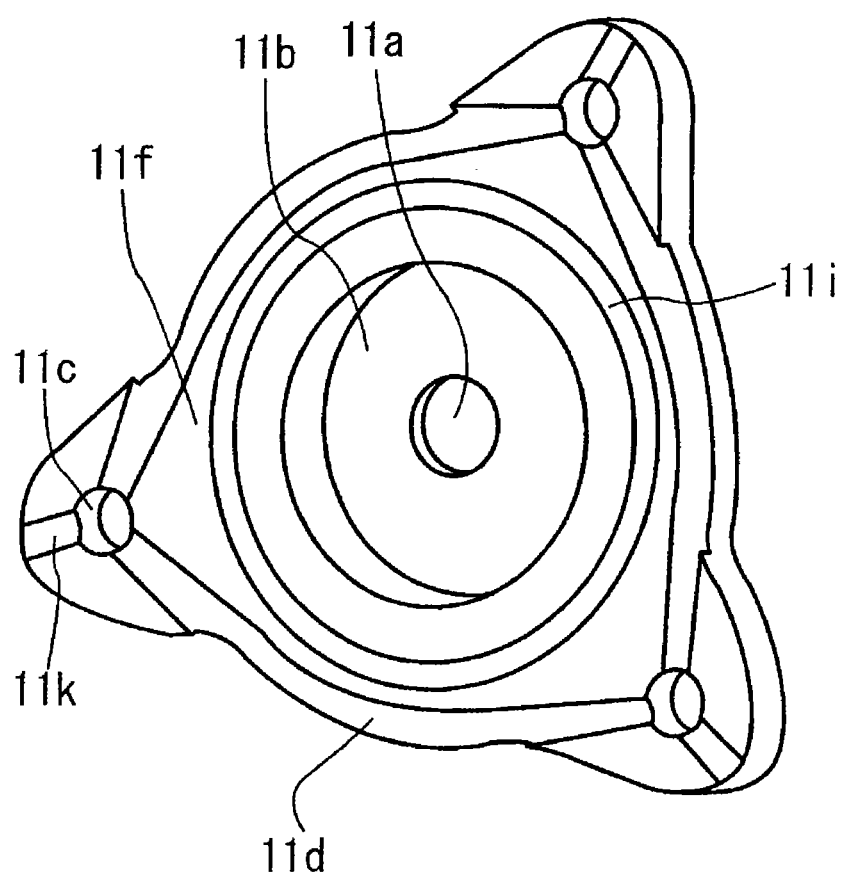
FIG. 3 is a perspective view of a housing.
Figure 4:
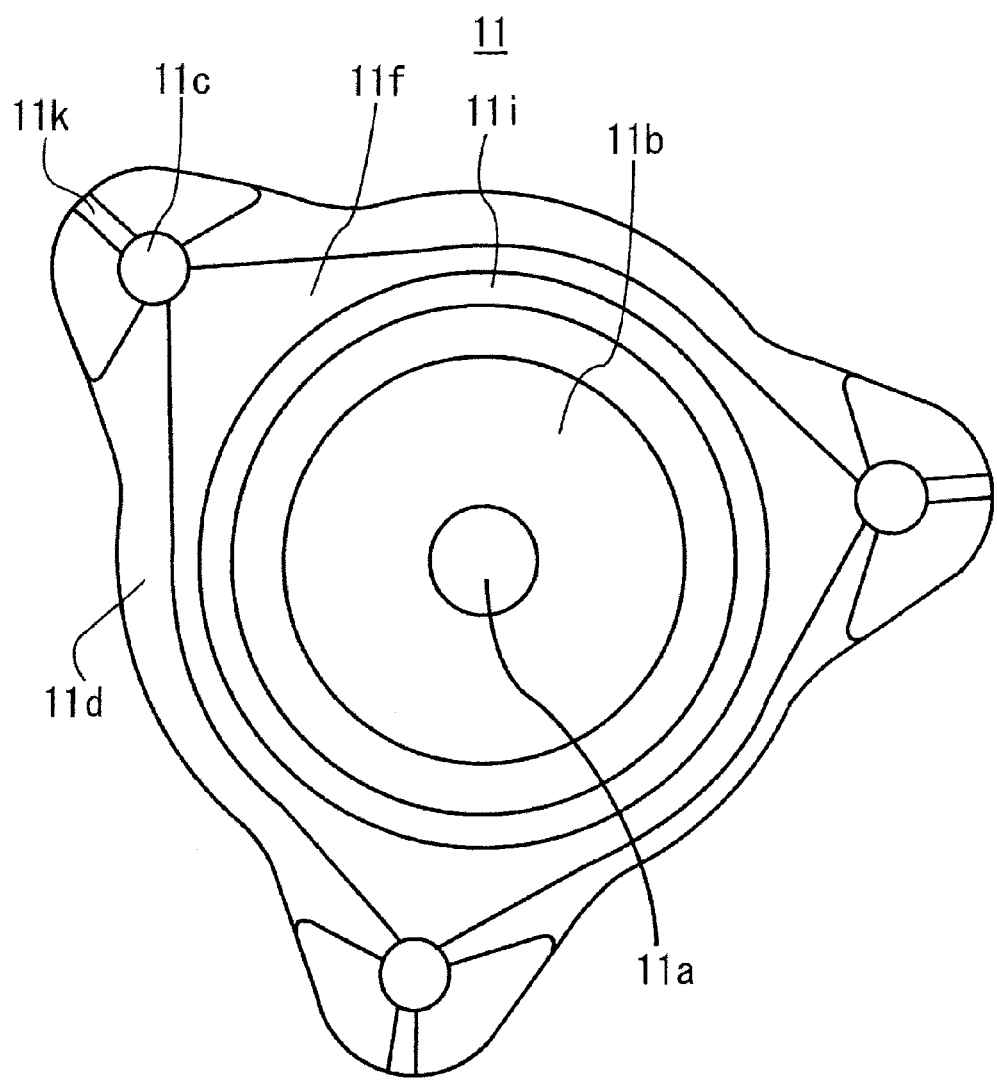
FIG. 4 is a top view of the housing as viewed in the direction shown by an arrow B in FIG. 1.

The housing 11 is in the form of a block, and has a pump chamber 11b as a flat columnar space formed in its pump chamber formation surface 11f. As shown in FIGS. 1, 3, and 4, the housing 11 has in its center an insertion hole 11a that extends therethrough so as to communicate with the pump chamber 11b. The rotary shaft 24 of the motor 20 is inserted through the insertion hole 11a.

Figure 2:
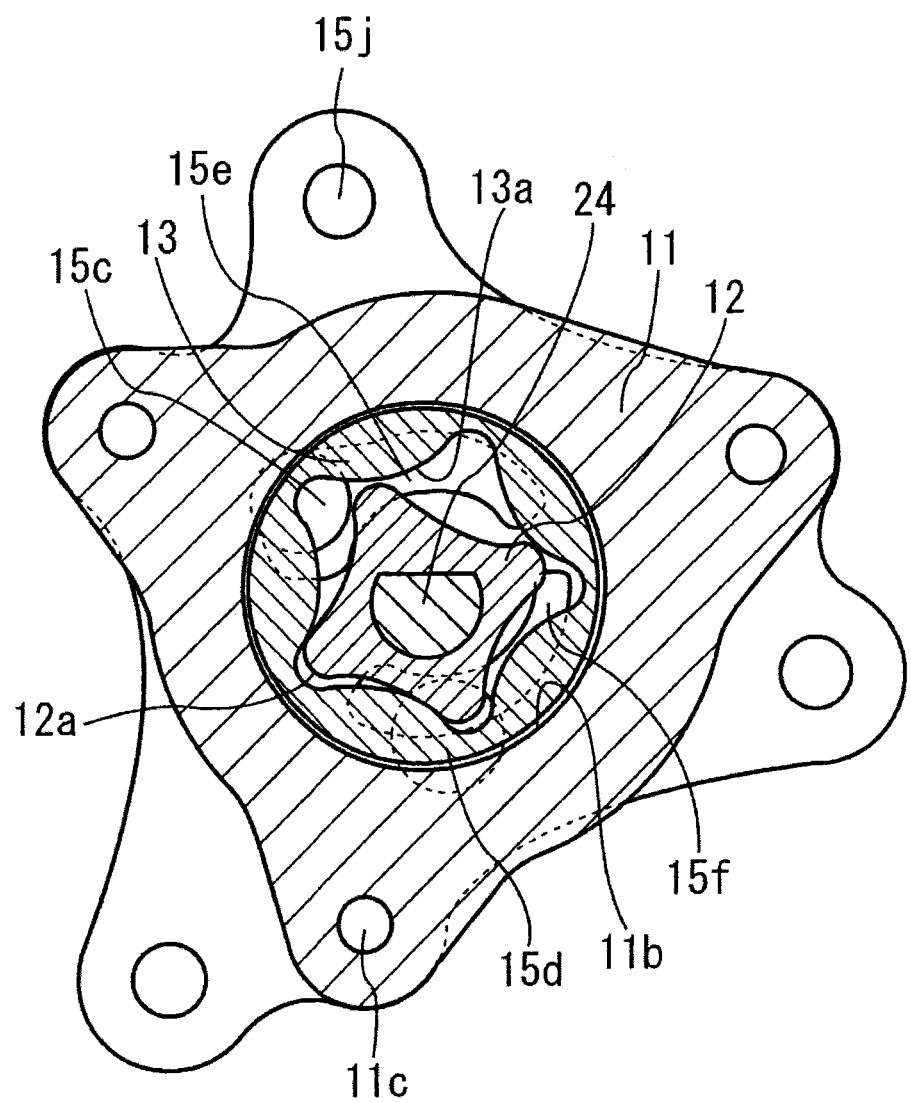
FIG. 2 is a sectional view of a pump body taken along line A-A in FIG. 1.

As shown in FIG. 2, the outer rotor 13 is rotatably accommodated in the pump chamber 11b. The outer rotor 13 has a flat columnar shape having a circular section, and has internal teeth 13a formed on its inner periphery. The inner rotor 12 is rotatably provided in the outer rotor 13. The inner rotor 12 has a ring shape, and has external teeth 12a formed on its outer periphery. The internal teeth 13a and the external teeth 12a are formed by using a plurality of trochoid curves. The number of external teeth 12a is smaller than that of internal teeth 13a. The external teeth 12a mesh with the internal teeth 13a. The rotation center of the outer rotor 13 is offset with respect to the rotation center of the inner rotor 12. The rotary shaft 24 of the motor 20 is fitted in the center of the inner rotor 12, so that the inner rotor 12 rotates together with the rotary shaft 24.

The plate 15 has a plate shape, and is attached to the pump chamber formation surface 11*f* of the housing 11 so as to close the pump chamber 11*b*. As shown in FIGS. 1 and 2, a suction-side groove 15*e* and a discharge-side groove 15*f*, each having a crescent shape, are formed at a predetermined interval in the surface of the plate 15 which faces the pump chamber 11*b*. The suction-side groove 15*e* and the discharge-side groove 15*f* face each other on the surface of the plate 15 which faces the pump chamber 11*b*. The suction-side groove 15*e* and the discharge-side groove 15*f* are formed at positions corresponding to a track along which a space formed between the external and internal teeth 12*a*, 13*a* moves.

The plate 15 has a suction port 15*c* that extends to the bottom of the suction-side groove 15*e* so as to communicate with the suction-side groove 15*e*. The position where the suction port 15*c* connects to the bottom of the suction-side groove 15*e* is a starting end of the suction-side groove 15*e* over which the space formed between the external and internal teeth 12*a*, 13*a* first passes when moving over the suction-side groove 15*e*. The housing 11 has a discharge port 15*d* that extends to the bottom of the discharge-side groove 15*f* so as to communicate with the discharge-side groove 15*f*. The position where the discharge port 15*d* connects to the bottom of the discharge-side groove 15*f* is a terminal end of the discharge-side groove 15*f* over which the space formed between the external and internal teeth 12*a*, 13*a* passes last when moving over the discharge-side groove 15*f*. The suction port 15*c* connects through a suction flow path 91 to a reservoir (not shown) that stores oil. The discharge port 15*d* connects to an oil supply portion of the external device 999 through a discharge flow path 92.

When the motor 20 is rotated, the inner rotor 12 is rotated and the outer rotor 13 whose internal teeth 13*a* mesh with the external teeth 12*a* is also rotated. The space formed between the external and internal teeth 12*a*, 13*a* therefore sequentially move over the suction port 15*c*, the suction-side groove 15*e*, the discharge-side groove 15*f*, and the discharge port 15*d*, and oil is fed from the suction port 15*c* to the discharge port 15*d*.

As shown in FIGS. 3 and 4, the housing 11 has an O-ring groove 11*i* formed in the pump chamber formation surface 11*f* so as to extend along the entire circumference of the pump chamber 11*b*. The O-ring 14 is placed in the O-ring groove 11*i*. The O-ring 14 closely contacts the plate 15 to ensure that the pump chamber 11*b* is oil-tight.

As shown in FIGS. 1 and 2, the plate 15 has a plurality of attachment holes 15*j* extending therethrough. As shown in FIG. 1, bolts 17 to be screwed into the external device 999 are inserted through the attachment holes 15*j*, whereby the plate 15 is attached to the external device 999. That is, the pump 100 is attached to the external device 999. As shown in FIG. 1, the pump 100 is attached to the external device 999 such that the rotational axes of the inner rotor 12 and the outer rotor 13 extend in the horizontal direction.

As shown in FIGS. 3 and 4, the housing 11 has a plurality of through holes 11*c* that are formed outside the O-ring groove 11*i* in the pump chamber formation surface 11*f*. As shown in FIG. 1, the plate 15 has threaded holes 15*g* at positions corresponding to the positions where the through holes 11*c* are formed. Bolts 16 are inserted through the through holes 11*c* and screwed into the threaded holes 15*g* to attach the plate 15 to the housing 11. The bolts 16 are separated from the through holes 11*c*.

As shown in FIGS. 3 and 4, inter-hole grooves 11*d* connecting the through holes 11*c* are formed outside the O-ring groove 11*i* in the pump chamber formation surface 11*f*. The inter-hole grooves 11*d* connect to the outer edge of the housing 11. As shown in FIG. 4, the lateral dimension of the inter-hole grooves 11*d* decreases toward the through hole 11*c*.

The housing 11 has three drain grooves 11*k* formed in the pump chamber formation surface 11*f* so as to extend from the through holes 11*c* to the outer edge of the pump chamber formation surface 11*f*. One of the three drain grooves 11*k* opens downward of the housing 11.

A discharge recess is formed by the inter-hole grooves 11*d* and the drain grooves 11*k*. The discharge recess connecting to the outer edge of the pump chamber formation surface 11*f* is thus formed along the entire circumference of the O-ring groove 11*i* in the pump chamber formation surface 11*f*.

In the pump 110 configured as described above, even if salt water such as seawater enters between the housing 11 and the plate 15, rainwater enters the inter-hole grooves 11*d* (discharge recess) connecting to the outer edge of the pump chamber formation surface 11*f* and rinses off the salt present between the housing 11 and the plate 15 when it rains. The salt therefore does not remain between the housing 11 and the plate 15. This prevents rusting from the salt remaining between the housing 11 and the plate 15 and prevents reduction in capacity efficiency due to an increase in side clearance.

Since the inter-hole grooves 11*d* are formed in the pump chamber formation surface 11*f*, the area of the close contact surface between the housing 11 and the plate 15 is small compared to pumps having no inter-hole groove 11*d* formed in the pump chamber formation surface 11*f*. Accordingly, even if rust forms on the close contact surface between the housing 11 and the plate 15, the force of the rust that moves the housing 11 and the plate 15 away from each other is small due to the small area of the close contact surface between the housing 11 and the plate 15, as compared to the pumps having no inter-hole groove 11*d* formed in the pump chamber formation surface 11*f*. The housing 11 and the plate 15 are therefore less likely to be separated from each other, and the side clearance is less likely to be increased. This suppresses reduction in capacity efficiency due to an increase in side clearance.

Since the inter-hole grooves 11*d* are formed so as to extend to the through holes 11*c*, the area of the close contact surface between the housing 11 and the plate 15 can further be reduced. This can reduce the force of rust that moves the housing 11 and the plate 15 away from each other and can suppress an increase in side clearance.

Figure 5:
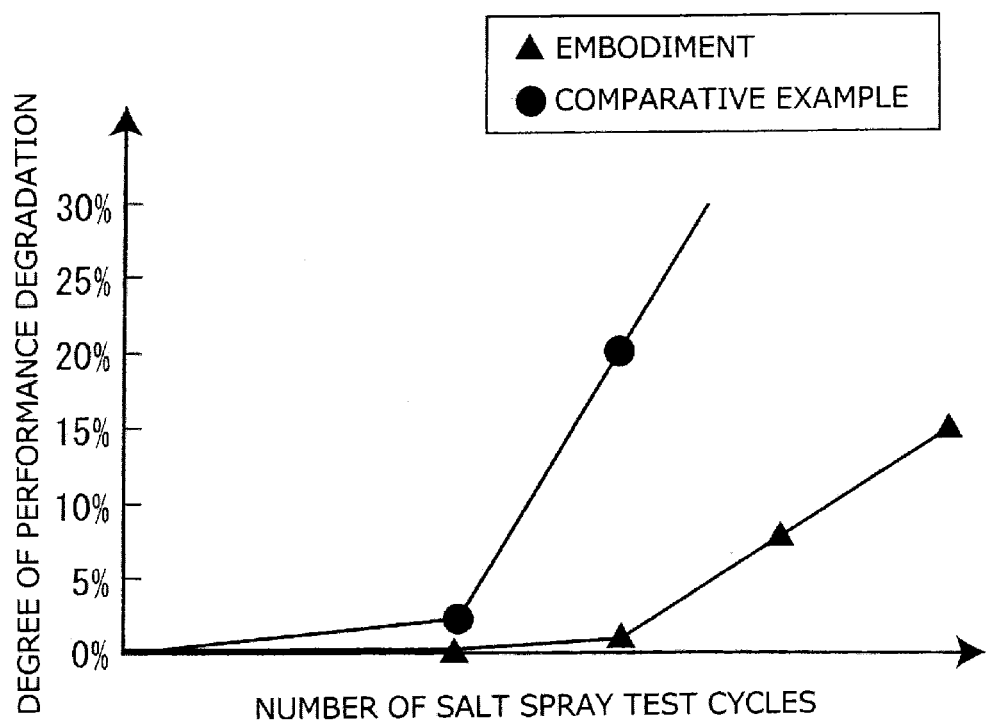
FIG. 5 is a graph showing the relationship between the number of salt spray test cycles and the degree of performance degradation.

As shown in FIG. 5, in the pump 100 of the present embodiment, an increase in degree of performance degradation is suppressed even if the number of cycles of a salt water spray test is increased, as compared to a pump of a comparative example having no inter-hole groove 11*d* formed in the pump chamber formation surface 11*f*. As used herein, the "salt water spray test" refers to a test method in which spraying salt water onto a target object, drying the target object at a predetermined temperature, and placing the target object in a wet condition at a predetermined temperature are repeated. The "degree of performance degradation" refers to the degree of reduction in capacity efficiency, expressed as a percentage.

The drain grooves 11*k* extending from the through holes 11*c* to the outer edge of the pump chamber formation surface 11*f* are formed in the pump chamber formation surface 11*f*. This allows salt water having entered the through holes 11*c* to be discharged from the drain grooves 11*k*, and thus prevents corrosion of the bolts 16 inserted through the through holes 11*c*.

The lateral dimension of the inter-hole grooves 11*d* decreases toward the through holes 11*c*. Accordingly, since the contact area between the housing 11 and the plate 15 is large at positions close to the through holes 11*c*, the axial force of the bolts 16 that are inserted through the through holes 11c can be supported by the contact surface between the housing 11 and the plate 15. This prevents curving of the plate 15 and an increase in side clearance. Since the lateral dimension of the inter-hole grooves 11d increases as farther away from the through holes 11c, the area of the close contact surface between the housing 11 and the plate 15 can further be reduced. This can reduce the force of rust that moves the housing 11 and the plate 15 away from each other and can suppress an increase in side clearance.

The plate 15 is attached to the external device 999. Accordingly, by forming the attachment holes 15j in the plate 15 so that the bolts 17 to be screwed into the external device 999 can be inserted therethrough, the pump 100 can be attached to the external device 999 by a simple structure.

In the structure in which the plate 15 is thus attached to the external device 999 and the pump 100 is attached to the external device 999, the plate 15 supports the weight of the members of the pump 100 other than the plate 15 and is therefore required to be strong. Forming the inter-hole grooves 11d in the plate 15 reduces strength of the plate 15. Increasing the thickness dimension of the plate 15 to ensure the strength of the plate 15 increases the axial dimension of the pump 100. In the present embodiment, however, the inter-hole grooves 11d are formed in the housing 11 having the pump chamber 11b and having a larger thickness dimension. This can prevent an increase in axial dimension of the pump 100 while maintaining the strength of the plate 15.

The inter-hole grooves 11d and the drain grooves 11k connect to the outer edge of the pump chamber formation surface 11f at least at two positions. Accordingly, rainwater enters the inter-hole groove 11d and the drain groove 11k which connect to the outer edge of the pump chamber formation surface 11f at one of the two positions, and is discharged from the inter-hole groove 11d and the drain groove 11k which connect to the outer edge of the pump chamber formation surface 11f at the other position. The rainwater therefore reliably rinses off salt that is present in the inter-hole grooves 11d and the drain grooves 11k, which prevents deposition of the salt in the inter-hole grooves 11d and the drain grooves 11k.

One of the inter-hole grooves 11d and one of the drain grooves 11k open downward. Salt water or rainwater having entered the inter-hole grooves 11d and the drain grooves 11k is therefore reliably discharged from the inter-hole groove 11d and the drain groove 11k which open downward. This prevents deposition of salt in the inter-hole grooves 11d and the drain grooves 11k.

In the above embodiment, the inter-hole grooves 11d connect to the outer edge of the pump chamber formation surface 11f. In another embodiment, however, the inter-hole grooves 11d may not connect to the outer edge of the pump chamber formation surface 11f. Even in such an embodiment, since the drain grooves 11k connect to the outer edge of the pump chamber formation surface 11f, rainwater enters the drain grooves 11k connecting to the outer edge of the pump chamber formation surface 11f and rinses off salt that is present between the housing 11 and the plate 15.

Figure 6:
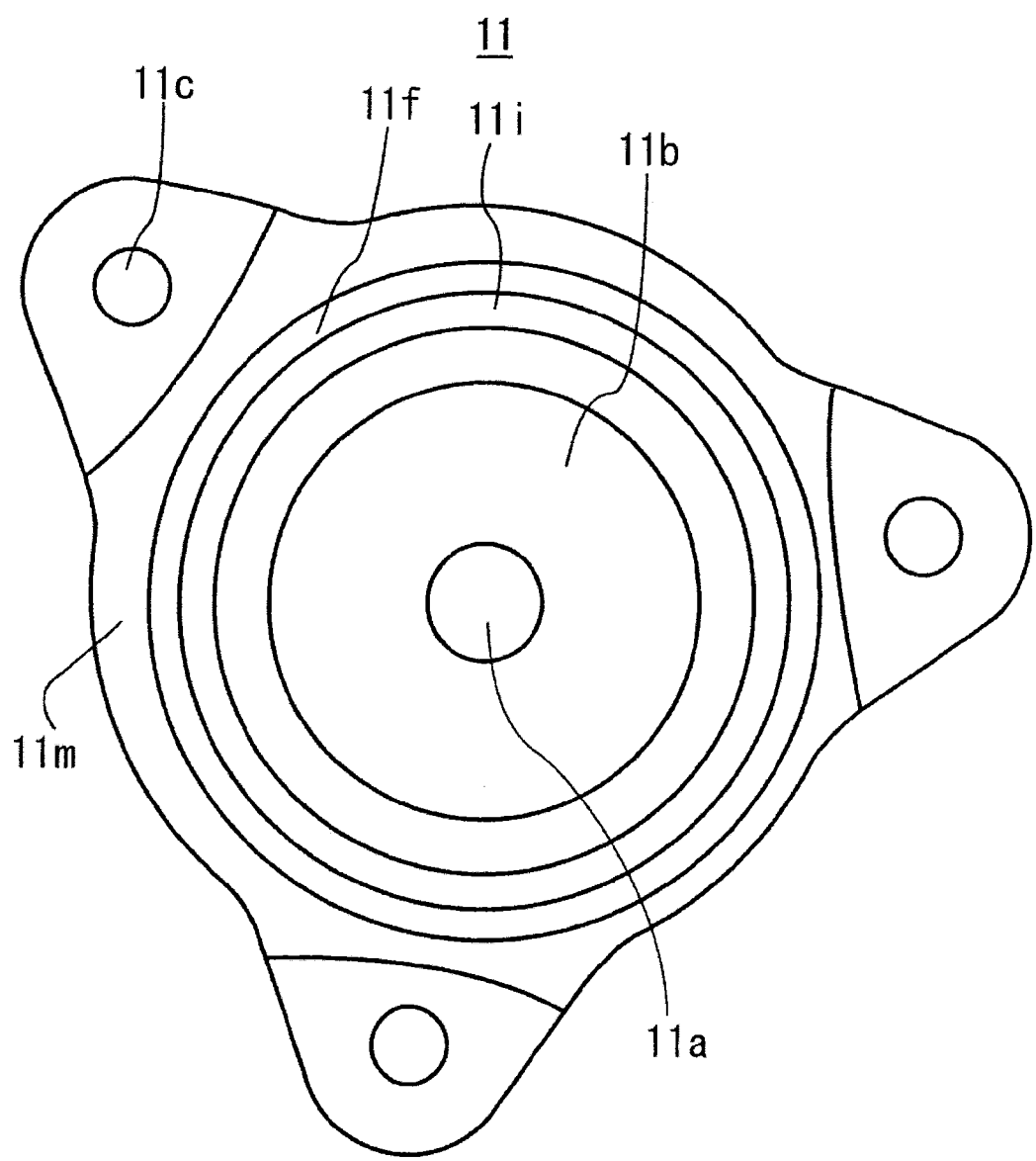
FIG. 6 is a top view of a housing of a pump according to another embodiment as viewed in the direction shown by the arrow B in FIG. 1.

As shown in FIG. 6, in the pump 100, a discharge recess 11m connecting to the outer edge of the pump chamber formation surface 11f may be formed along the entire circumference of the O-ring groove 11i in the pump chamber formation surface 11f, instead of the inter-hole grooves 11d and the drain grooves 11k. Even in such a pump 100, rainwater enters the discharge recess 11m connecting to the outer edge of the pump chamber formation surface 11f and rinses off salt that is present between the housing 11 and the plate 15. Moreover, since the area of the close contact surface between the housing 11 and the plate 15 is small compared to pumps having no discharge recess 11m formed in the pump chamber formation surface 11f, the force of rust that moves the housing 11 and the plate 15 away from each other is small, and the side clearance is less likely to be increased.

In the above embodiment, the bolts 16 are screwed into the plate 15. In another embodiment, however, the bolts 16 may be screwed into the housing 11 to attach the plate 15 to the housing 11 by the bolts 16.

In the above embodiment, a rotary member that is accommodated in the pump chamber 11b and discharge oil is the inner rotor 12 and the outer rotor 13. In another embodiment, however, the rotary member may be gears that are disposed in parallel in the pump chamber 11b and that mesh with each other, and the pump 100 may be a gear pump.

In the above embodiment, the pump 100 is an oil pump that discharges oil. However, liquid that is discharged from the pump 100 is not limited to the oil, and may be other liquid such as cooling water.

What is claimed is:

1. A pump, comprising:
   a housing having a pump chamber formation surface, wherein a pump chamber accommodating a rotary member extends into the housing from the pump chamber formation surface;
   an O-ring groove formed around the pump chamber in the pump chamber formation surface;
   an O-ring is placed in the O-ring groove;
   a plate attached to the pump chamber formation surface and closely contacting the O-ring to close the pump chamber; and
   a discharge recess provided in the housing, the discharge recess being recessed with respect to the pump chamber formation surface, to be separated from the plate, the discharge recess surrounding an entirety of the circumference of the O-ring groove and extending from the outer edge of the housing to the outer edge of the pump chamber formation surface.

2. The pump according to claim 1, further comprising through holes, through which bolts for attaching the housing to the plate may be inserted, extend in the housing to the pump chamber formation surface,
   wherein the discharge recess is formed by the through holes and an inter-hole groove that connects the through holes.

3. The pump according to claim 2, further comprising drain grooves extending from the through holes to the outer edge of the housing.

4. The pump according to claim 2, wherein
   the inter-hole groove is formed such that its width in a direction parallel to the pump chamber formation surface decreases toward the through holes.

5. The pump according to claim 1, wherein
   the discharge recess connects to the outer edge of the pump chamber formation surface at least at two positions.

6. The pump according to claim 5, wherein
   the discharge recess opens downward in a direction of gravity.

* * * * *